United States Patent [19]

Guthrie

[11] 4,134,298

[45] Jan. 16, 1979

[54] TURBINE FLOWMETER

[75] Inventor: James F. Guthrie, Tempe, Ariz.

[73] Assignee: Flow Technology, Inc., Phoenix, Ariz.

[21] Appl. No.: 800,562

[22] Filed: May 25, 1977

[51] Int. Cl.² .................... G01F 1/115; G01F 15/10
[52] U.S. Cl. ................................................ 73/231 R
[58] Field of Search ................... 73/194 R, 197, 230, 73/231 R, 272 R, 189

[56] References Cited

U.S. PATENT DOCUMENTS

| | | | |
|---|---|---|---|
| 2,078,837 | 4/1937 | Carter | 73/194 R X |
| 3,279,496 | 10/1966 | Klass et al. | 73/231 R |
| 4,030,359 | 6/1977 | Stapler | 73/231 R |

OTHER PUBLICATIONS

"Two Range Flow Rate and Totalizing System" from Instruments & Automation, vol. 30, pp. 276–278, Feb. 1957.

*Primary Examiner*—James J. Gill
*Attorney, Agent, or Firm*—Christie, Parker & Hale

[57] ABSTRACT

A turbine wheel is insertable in a line to intercept fluid flowing therethrough. A pickup coil senses the rotation of the turbine wheel. Responsive to the pickup coil, the speed of rotation of the turbine wheel is reduced when it exceeds a predetermined safe limit. Preferably, the speed reduction is accomplished by turning the turbine wheel 90° to the direction of fluid flow.

11 Claims, 3 Drawing Figures

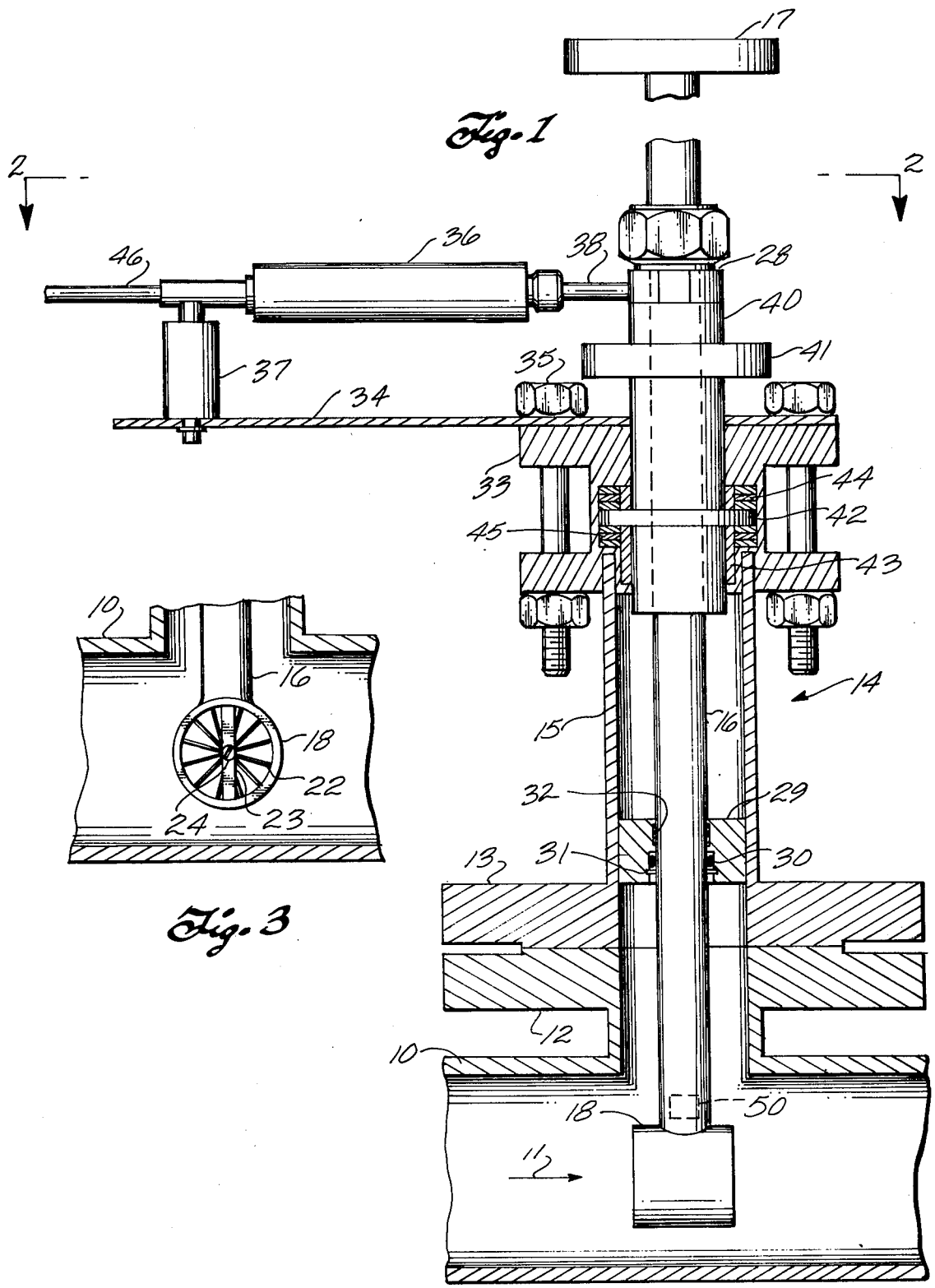

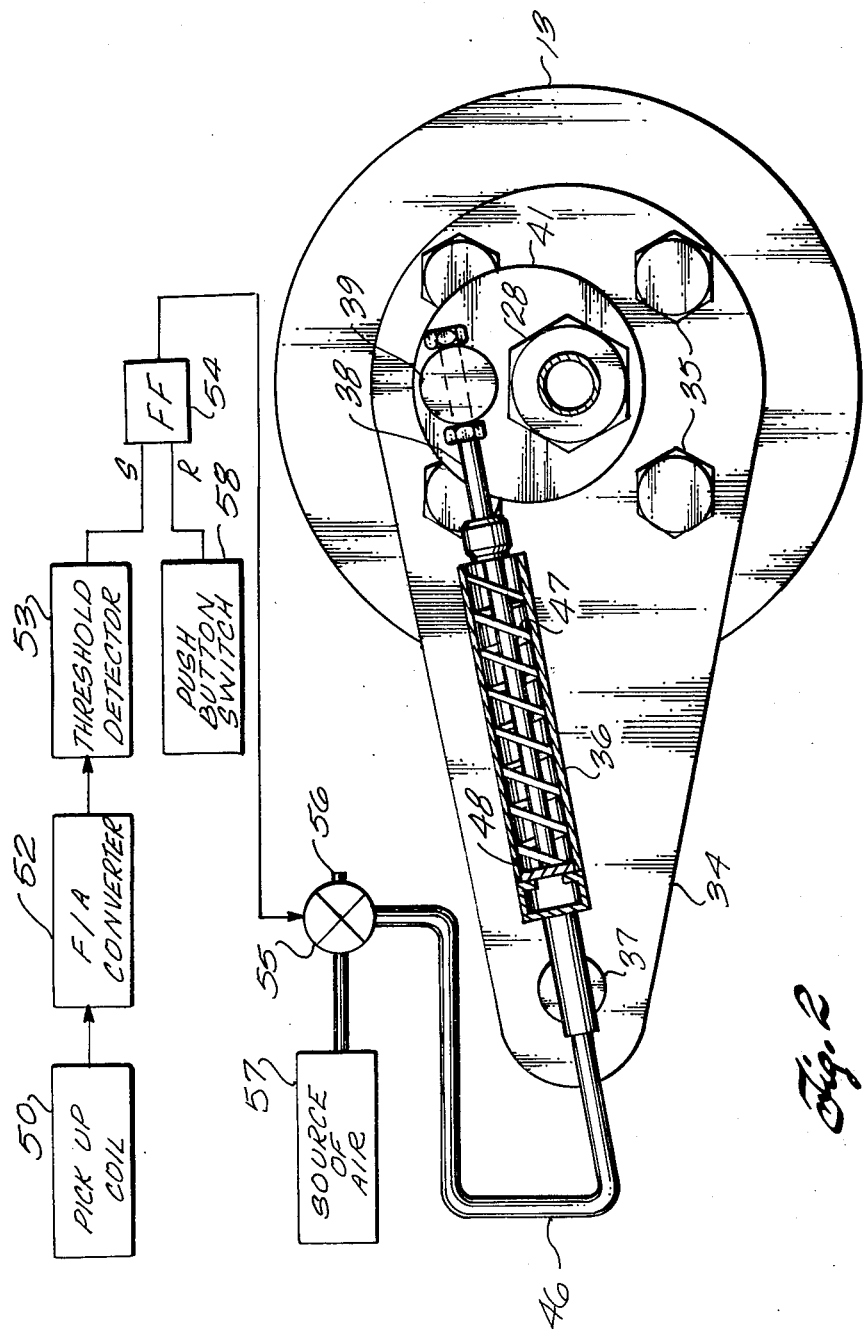

TURBINE FLOWMETER

BACKGROUND OF THE INVENTION

This invention relates to turbine flowmeters and, more particularly, to overspeed protection for a turbine flowmeter.

A turbine flowmeter has a rotatable turbine wheel positioned to intercept fluid flowing through a line. The turbine wheel rotates at a speed proportional to the fluid velocity. The rotation of the turbine wheel is sensed by a pickup coil, which provides pulses to actuate an indicator.

One class of turbine flowmeter is designed for insertion in a fluid flow line as a probe. Such a probe is generally designed to disturb fluid flow as little as possible. As a result, the turbine wheel is small and is usually supported for rotation by fragile ball bearings. Rotation of the turbine wheel at a speed above that for which the flowmeter is designed may damage the fragile ball bearings.

SUMMARY OF THE INVENTION

According to the invention, the rotation of the turbine wheel of a turbine flowmeter is reduced when it exceeds a predetermined safe speed limit. Preferably, the turbine wheel is rotated 90° to the direction of fluid flow responsive to a sensor of turbine wheel rotation. As a result, damage to fragile ball bearings for the turbine wheel is prevented.

BRIEF DESCRIPTION OF THE DRAWING

The features of a specific embodiment of the best mode contemplated of carrying out the invention are illustrated in the drawing, in which:

FIG. 1 is a side sectional view of a turbine flowmeter incorporating principles of the invention;

FIG. 2 is a top sectional view of the turbine flowmeter of FIG. 1 with electronic components shown in schematic form; and FIG. 3 is a side sectional view of the turbine flowmeter of FIG. 1 with the turbine wheel turned 90° to the direction of fluid flow.

DETAILED DESCRIPION OF THE SPECIFIC EMBODIMENT

In FIG. 1, fluid flows through a line 10 in the direction of an arrow 11. Line 10 has a mounting flange 12 to which a mounting flange 13 of a flowmeter 14 is secured by fasteners, not shown. One end of a cylinder 15 is integral with mounting flange 13. A rod 16 extends through cylinder 15 from a point outside line 10 to a point inside line 10. The end of rod 16 outside line 10 has a handle 17. A cylindrical housing 18 is integral with the end of rod 16 inside line 10.

As shown in FIG. 3, a turbine wheel 22 is disposed in housing 18. Supporting bars 23 are affixed inside housing 18 on both sides of turbine wheel 22. Turbine wheel 22 has a shaft, not shown, which is journaled for free rotation in supporting bars 23 by fragile ball bearings 24.

At one end, cylinder 15 has a SWAGE LOK compression fitting 28 to fix the axial position of rod 16 in line 10. At the other end, a plug 29 is secured to cylinder 15. Rod 16 extends through a passage in plug 29 with a loose fit. An O-ring 30 is retained in a groove near the bottom of plug 29 by a retaining ring 31 to prevent leakage of fluid between plug 29 and rod 16 into cylinder 15 from line 10. An annular insert 32 made of a low friction material, such as RULON, is fixed in a groove at the top of plug 29. Insert 32 fits snugly around rod 16. Rod 16 and cylinder 15 serve to insert turbine wheel 22 into line 10. To change the extent of insertion, fitting 28 is loosened and rod 16 is repositioned by pushing or pulling on handles 17, while insert 32 guides rod 16 through cylinder 15. Then, compression fitting 28 is tightened again.

A bearing housing 33 is attached to the end of cylinder 15 opposite to flange 13. A support member 34 is secured to bearing housing 33 by bolts 35. An air cylinder 36 is rotatably attached to support 34 by a spacer 37. Air cylinder 36 has a movable arm 38, which is secured to a ped 39 (FIG. 2). Attached to compression fitting 28 is a sleeve 40 though which rod 16 passes. Peg 39 is rotatably mounted on a circular support member 41 which is eccentrically attached to sleeve 40. Within bearing housing 33, sleeve 40 has a flange 42 mounted for rotation relative to bearing housing 33 by a bifurcated sleeve bearing 43 on either side of flange 42 and roller bearings 44 and 45, which surround sleeve bearing 43. One race of each of roller bearings 44 and 45 is attached to flange 42. The other race of each of roller bearings 44 and 45 is attached to bearing housing 33. Arm 38 of air cylinder 36 is attached to a piston 48 in air cylinder 36, which is normally biased by a spring 47 to hold arm 38 in the position shown in FIG. 2. In this position of arm 38, rod 16 is oriented so the axis of rotation of turbine wheel 22 is parallel to the direction of fluid flow through line 10. When compressed air is supplied to air cylinder 36 by a hose 46 on the side of piston 48 opposite to spring 47, air cylinder 36 is actuated; the force of spring 47 is overcome and arm 38 extends to the right, as viewed in FIG. 2, to turn rod 16 through an angular displacement of 90°, and to turn the axis of rotation of turbine wheel 22 90° to the direction of fluid flow, as illustrated in FIG. 3. The force of the fluid in line 10 exerts an axial thrust on rod 16, which is taken up by roller bearings 44 and 45 via swage lock 28, sleeve 40, and flange 42, while permitting rod 16 to rotate without axial movement when air cylinder 36 is actuated.

A pickup coil designated schematically at 50 is disposed in close proximity to turbine wheel 22. Each time a blade of turbine wheel 22 passes pickup coil 50, a pulse is generated by pickup coil 50. The pulses are transmitted by wires passing through rod 16 to pulse shaping circuitry in a housing next to handle 17. As shown in FIG. 2, the pulses are applied to a frequency-to-analog (F/A) converter 52 which produces an analog signal proportional to the frequency of such pulses. The output of frequency-to-analog converter 52 is connected to a threshold detector 53. When the amplitude of the analog signal exceeds a predetermined value representative of a safe limit on the rotational speed for turbine wheel 22, threshold detector 53 produces a trigger pulse which is applied to the S input of a flip-flop 54. The output of flip-flop 54 is applied as a control signal to a solenoid valve 55 having an exhaust port 56. A source of compressed air 57 is coupled to the inlet of valve 55 and hose 46 is coupled to the outlet of valve 55. Normally, the output of flip-flop 54 is not energized, and hose 46 is connected to exhaust port 56. When threshold detector 53 produces a trigger pulse, flip-flop 54 is set, its output is energized, and valve 55 connects source of air 57 to hose 46, thereby extending arm 38 of air cylinder 36. A pushbutton switch 58 is connected to the reset input of flip-flop 54. When the pushbutton is depressed, the switch produces a trigger pulse that resets flip-flop 54 and deenergizes its output. Thus, once the safe speed limit is exceeded, turbine wheel 22 is not returned to its operative position until pushbutton switch 58 is actuated.

To summarize, turbine wheel 22 is normally located in line 10 with its axis of rotation parallel to the direction of fluid flow through line 10, as depicted in FIG. 1. In this position, turbine wheel 22 intercepts the fluid flowing through line 10 and rotates freely responsive to the intercepted fluid at a speed proportional to the fluid velocity. When the safe speed limit of turbine wheel 22 is exceeded, rod 16 is turned by air cylinder 36 90° to the direction of fluid flow, i.e., so the axis of rotation of turbine wheel 22 is perpendicular to the direction of fluid flow. In this position, depicted in FIG. 3, turbine wheel 22 intercepts no or negligible fluid flowing through line 10 and is thus protected from damage to ball bearings 24. Turbine wheel 22 remains in this position until the reset button is pushed. Thus, the speed of rotation of turbine wheel 22 is reduced to zero without diverting or changing the fluid flowing through line 10, when the speed of turbine wheel 22 exceeds a predetermined safe limit.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention, as set forth in the following claims. For example, the rotation of turbine wheel 22 could be reduced by closing the passage through housing 18 to fluid flow as described in application Ser. No. 800,557, filed by James F. Guthrie and Richard E. Zimmermann on even date herewith and assigned to the assignee of the present application. Or, the principles of the invention could be applied in an in-line flowmeter, rather than a probe-type flowmeter.

What is claimed is:

1. A turbine flowmeter comprising:
   a turbine wheel;
   means for supporting the turbine wheel for free rotation;
   means for inserting the turbine wheel in a line to intercept fluid flowing therethrough and to rotate freely responsive to the intercepted fluid;
   means for sensing the rotation of the turbine wheel; and
   means responsive to the sensing means for reducing the speed of rotation of the turbine wheel when the speed of the turbine wheel exceeds a predetermined safe limit without diverting or changing the fluid flowing through the line.

2. The turbine flowmeter of claim 1, in which the speed reducing means comprises means for rotating the supporting means to reduce the fluid intercepted by the turbine wheel.

3. The turbine flowmeter of claim 2, in which the rotating means turns the turbine wheel 90° to the direction of fluid flow through the line.

4. The turbine flowmeter of claim 3, in which the supporting means comprises a cylindrical housing, a supporting bar afixed to the housing, and a set of ball-bearings journaling the turbine wheel in the supporting bar.

5. The turbine flowmeter of claim 4, in which the supporting means additionally comprises a rod integral with the cylindrical housing, and the rotating means turns the rod.

6. The turbine flowmeter of claim 1, in which the supporting means comprises a cylindrical housing, a supporting bar afixed to the housing, and a set of ball-bearings journaling the turbine wheel in the supporting bar.

7. The turbine flowmeter of claim 6, in which the supporting means additionally comprises a rod integral with the cylindrical housing, and the speed reducing means turns the rod.

8. The turbine flowmeter of claim 2, in which the inserting means comprises:
   a cylinder;
   means for attaching the cylinder to the line;
   a rod passing through the cylinder into the line, the turbine wheel being mounted on the end of the rod in the line;
   means for locking the rod against axial movement relative to the cylinder; and
   means for supporting the rod for rotation relative to the cylinder.

9. The turbine flowmeter of claim 8, in which the means for locking the rod against axial movement is a compression fitting and a sleeve attached to the compression fitting through which the rod passes.

10. The turbine flowmeter of claim 9, in which the means for supporting the rod for rotation comprises a flange on the sleeve, a bearing housing attached to the cylinder, a bifurcated sleeve bushing between the sleeve and the bearing housing on both sides of the flange, and roller bearings around the bifurcated sleeve bearing on both sides of the flange to support the flange for rotation relative to the bearing housing.

11. A turbine flowmeter comprising:
    a housing having a passage extending therethrough;
    a turbine wheel;
    means for supporting the turbine wheel for free rotation in the passage;
    means for inserting the housing in a flow line so fluid flows through the passage and around the passage, the turbine wheel intercepting fluid flowing through the passage and rotating freely responsive to the intercepted fluid;
    means for sensing the rotation of the turbine wheel; and
    means responsive to the sensing means for reducing the speed of rotation of the turbine wheel when the speed of the turbine wheel exceeds a predetermined safe limit without diverting or changing the fluid flowing through the line around the passage.

* * * * *